July 31, 1962  L. W. JOHNSON  3,046,916
COTTON PLANTER

Filed Jan. 27, 1958  6 Sheets-Sheet 1

INVENTOR.
LESLIE W. JOHNSON
BY
*C. D. Parker & R. C. Johnson*
ATTORNEYS

INVENTOR.
LESLIE W. JOHNSON

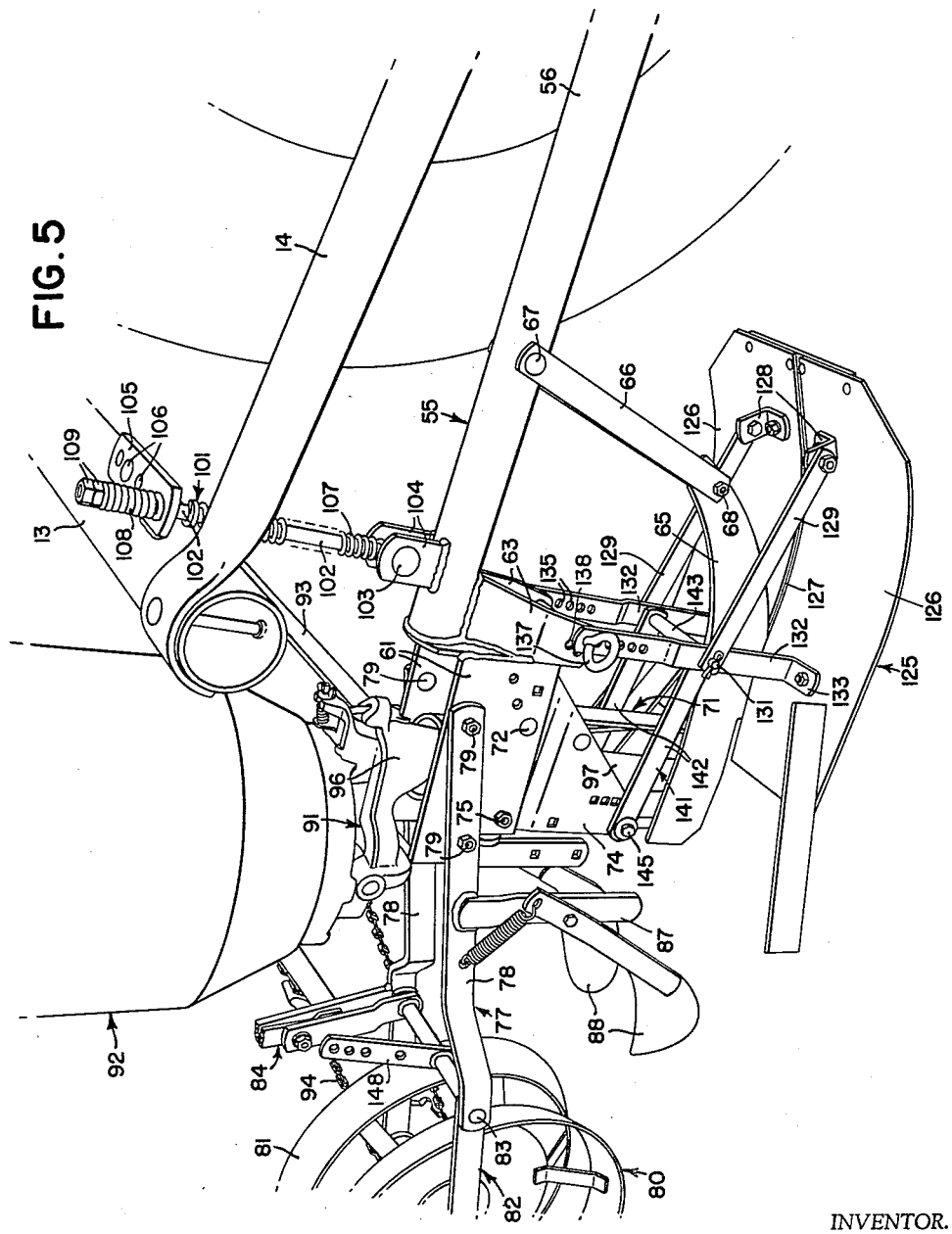

July 31, 1962
L. W. JOHNSON
3,046,916
COTTON PLANTER
Filed Jan. 27, 1958
6 Sheets-Sheet 5
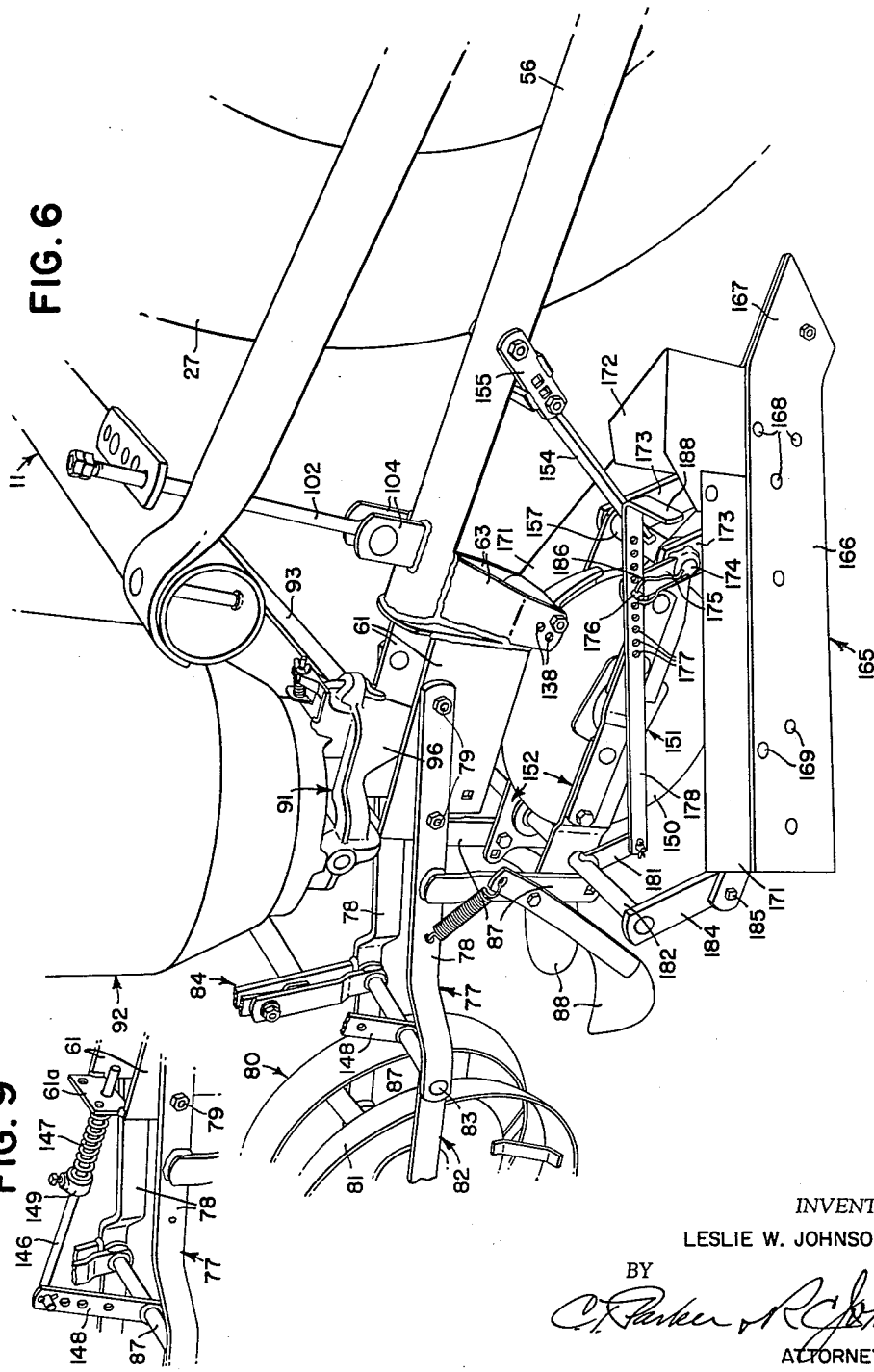
INVENTOR.
LESLIE W. JOHNSON
BY
C. L. Parker R. C. Johnson
ATTORNEYS July 31, 1962  L. W. JOHNSON  3,046,916
COTTON PLANTER
Filed Jan. 27, 1958  6 Sheets-Sheet 6
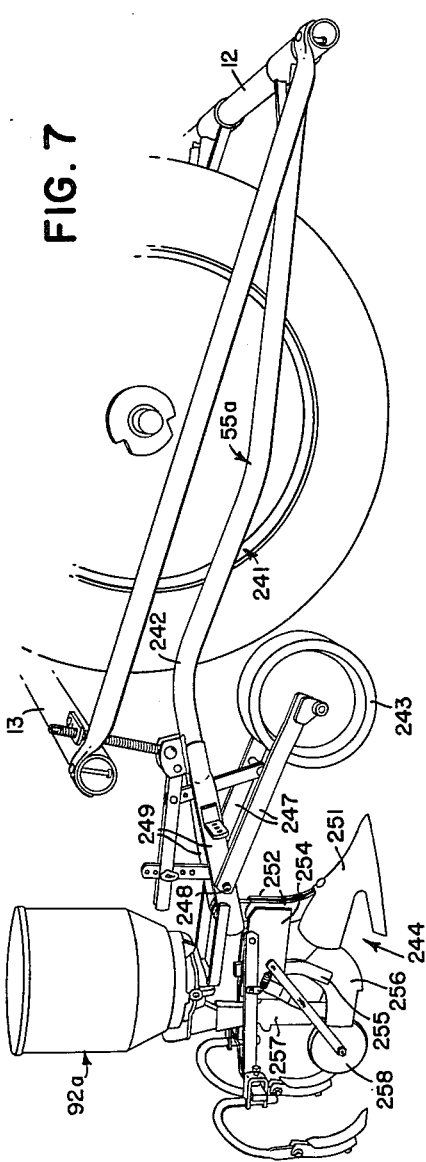
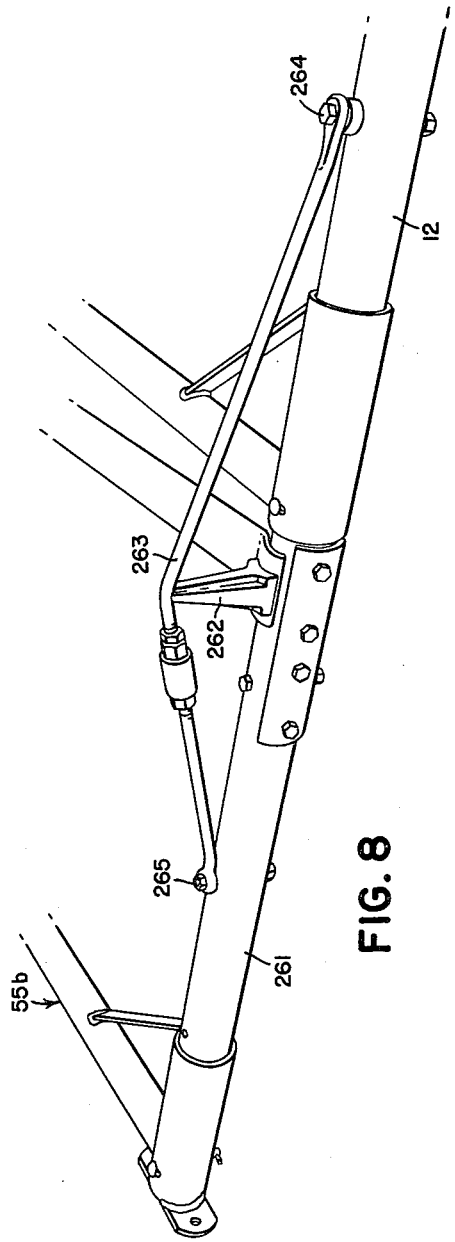
INVENTOR.
LESLIE W. JOHNSON United States Patent Office 3,046,916
Patented July 31, 1962

3,046,916
COTTON PLANTER
Leslie W. Johnson, Moline, Ill., assignor, by mesne assignments, to Deere & Company, a corporation of Delaware
Filed Jan. 27, 1958, Ser. No. 711,242
7 Claims. (Cl. 111—59)

The present invention relates generally to agricultural implements and more particularly to implements of the type that are adapted to be mounted on a farm tractor.

The object and general nature of the present invention is the provision of a tractor mounted planter that is so constructed and arranged as to be readily attachable to the tractor merely by backing the tractor into position relative to the implement and then connecting the rear portion of the implement with the power lift system of the tractor, after which operating the power lift means acts automatically to connect the implement in draft-receiving relation therewith, all without the operator dismounting from his station on the tractor.

More specifically, it is a feature of this invention to provide a planter or similar implement with a first or main frame adapted to be carried directly on the tractor and supported at the front portion directly on the tractor and at its rear portion on the tractor through the power lift system of the tractor. Further, it is a feature of this invention to provide vertically swingable draw bar means connecting the several furrow opener units with the aforesaid main frame, and to provide means whereby, by operating the power lift means of the tractor to lower the main frame the weight of the main frame may be imposed on the furrow opening units, thus insuring that the latter units will operate at the required depth even though the ground may be quite hard.

Still further, another feature of this invention is a provision of an auxiliary operator's station carried rigidly by the main frame of the planter so that the weight of the operator will be added to the weight of the frame in forcing the furrow openers to and holding them at the required depth.

Other features of this invention are concerned with new and improved furrow opening units and associated parts, one such feature being a new and improved mounting for gauge shoes associated with the planter and another feature is a new and improved planting unit having a forwardly disposed ground engaging wheel that is especially constructed and arranged to serve as a gauge wheel when planting on prepared beds. This forwardly disposed ground wheel may also be used as a clod crushing means when planting is done on ground that has had minimum preparation, such as no further special preparation other than a plowing operation. Another feature of this invention is a provision of a new and improved mounting means for a sweep, one of such sweeps being associated with each seed furrow opener.

These and other objects and advantages of the present invention will be apparent to those skilled in the art after a consideration of the following detailed description of the preferred structure in which the principles of the present invention have been incorporated. In the accompanying drawings:

FIG. 5 is a fragmentary perspective view showing the means for mounting a gauge shoe on a planter runner and associated means for adjusting the position of the gauge shoe so as to provide means for controlling the depth of planting.

FIG. 6 is a similar perspective view showing new and improved means for mounting a sweep on a seed furrow opener of the double disk type.

FIG. 7 is a view showing a modified form of seeding unit in which a forwardly disposed clod-crushing roller is located in front of the seed dispensing means and in a position for crushing clods and the like and otherwise preparing a smooth path along which the furrow opener means travels during the planting operation.

FIG. 8 is a fragmentary perspective showing the manner in which the frame may be extended to provide means for receiving additional furrow opener units and associated draw bars, whereby a four-row implement may be transformed into a six-row implement.

FIG. 9 is a fragmentary perspective view showing pressure applying means for the press wheels.

Figure 1:
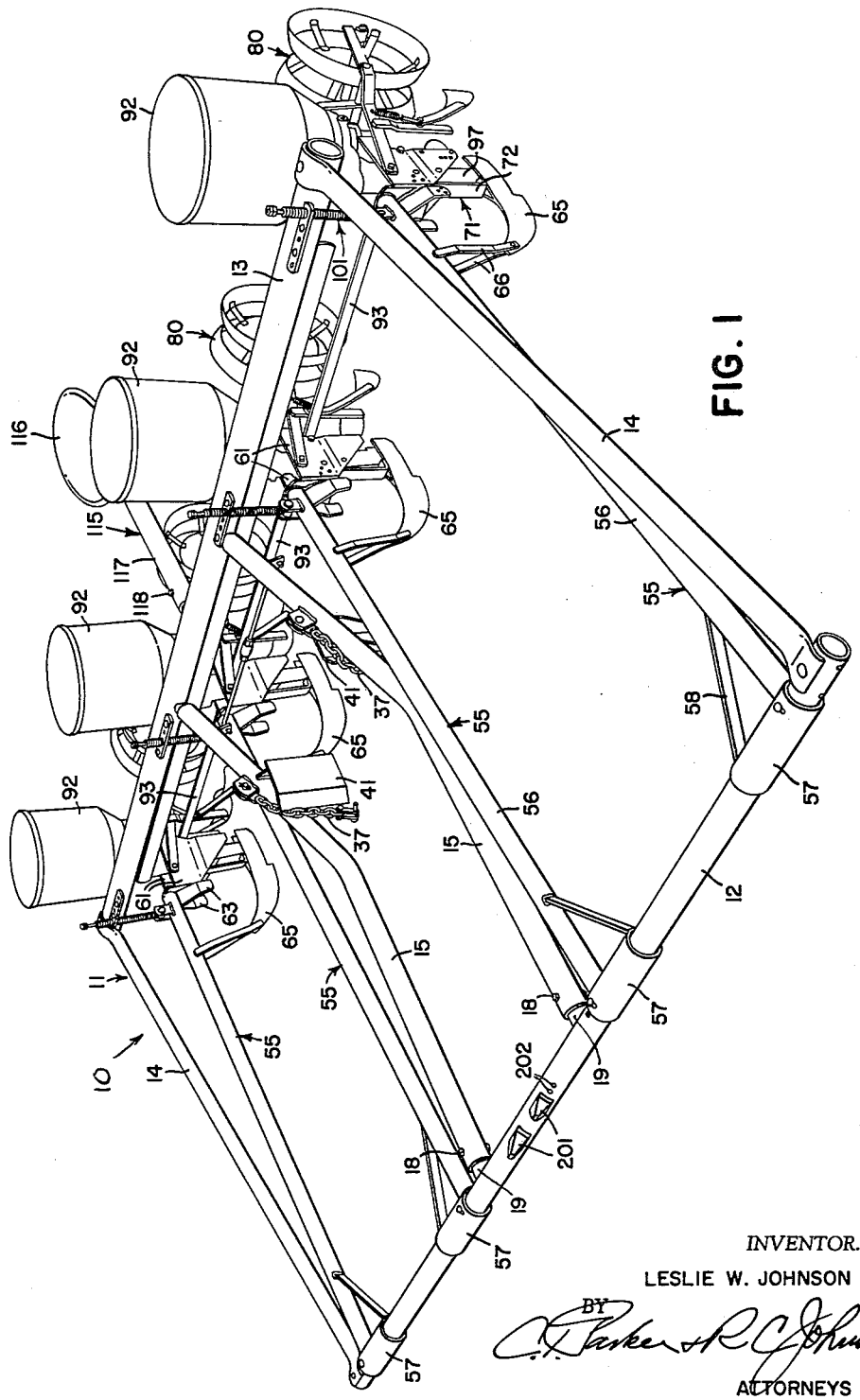
FIG. 1 is a perspective view of the four-row planter of the integral or tractor mounted type, the planter being shown in a position detached from the tractor.
Figure 2:
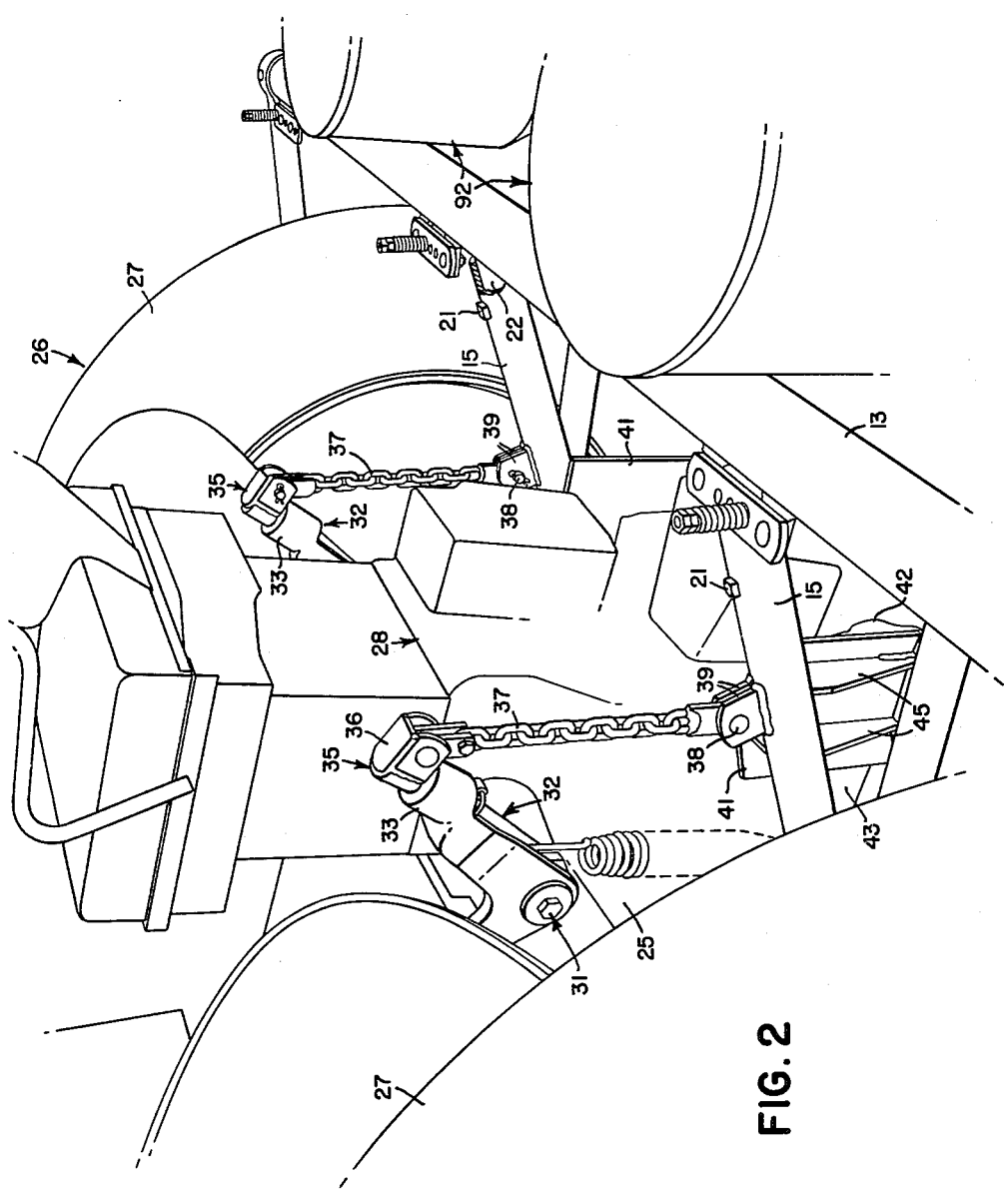
FIG. 2 is an enlarged fragmentary view showing certain details of the means connecting the rear portion of the planter with the associated tractor.

Referring first to FIG. 1, the principles of the present invention have been shown as embodied in a four-row integral planter indicated in its entirety by the reference numeral 10. The planter comprises a tractor-carried frame 11 that includes a front transverse bar 12 and a rear transverse bar 13, the transverse bars being rigidly interconnected by a pair of outer fore-and-aft extending bars 14 and a pair of inner generally fore-and-aft extending bars 15. The front and rear transverse bars 12 and 13, and the other bars 14 and 15, preferably are in the form of pipes or tubular members. The forward ends of the central fore-and-aft extending members 15 are connected by bolts 18 to short stubs 19 that are welded or otherwise fixedly attached to the generally central portion of the front transverse bar 12. The rear ends of the pipes 15 are bolted, as at 21 in FIG. 2, to forwardly extending stubs 22 welded or otherwise firmly attached to the central portion of the rear transverse bar 13. As will best be seen in FIG. 1, the central portions of the middle bars or pipe members 15 are bent downwardly to pass under the rear axle housings 25 of the tractor, which is indicated in its entirety by the reference numeral 26 in FIG. 2.

The tractor 26 is generally of conventional construction so far as the features of the present invention are concerned, the tractor having the usual drive wheels 27 carried by the usual axle shafts extending through the rear axle housings 25. Also, the tractor 26 is provided with power lift mechanism indicated in its entirety by reference numeral 28. This mechanism includes a transverse rockshaft 31 that extends across the rear of the tractor and which carries a lift arm 32 at each end. The outer end of each lift arm 32 is formed with a generally cylindrical section 33 that is adapted to receive a chain attachment plug 35. Each attachment plug 35 includes a head section 36 to which the upper end of the lifting chain 37 is connected. The lower end of each chain 37 extends downwardly from the associated lift arm 32 and is connected by detachable pin means 38 to apertured lugs 39 welded to the rear portions of the center pipe members 15. These portions of the center members 15, as best shown in FIG. 1, carry rub plates 41 that are adapted to bear against abutment castings 42 fixed to the draw bar support 43 of the tractor. Preferably, the rub plates 41 are reinforced by vertical members 45 welded to each plate 41 and also to the associated pipe member 15.

Referring again to FIG. 1, the implement of this invention includes a plurality of furrow opener units, each indicated by the numeral 55, that are swingably connected with the front transverse frame member 12 and extend below and generally rearwardly of the rear frame member 13. Each of the furrow opener units 55 includes a fore-and-aft extending pipe member 56 that is secured, as by welding, to a transverse sleeve 57 rockably disposed on the front cross bar 12. Each of the sleeve members 57 is reinforced by diagonal brace 58 welded to one end of the sleeve and to the adjacent portion of the associated pipe member 56. Secured to the rear end of each of the pipe members 56, as by welding, is a pair of bracket plates 61 (FIGS. 1 and 5) that extend generally rearwardly from the rear end of the pipe 56, and welded to each pair of plates 61, and also to the rear portion of the pipe 56, is a pair of downwardly extending bars 63 (FIG. 5) which form a yoke that acts with the bracket plates 61 to receive any one of several furrow opener or ground working means.

As best shown in FIGS. 1 and 5, one of such ground working or furrow opening means may take the form of a runner 65 that may be conventional per se so far as the principles of the present invention are concerned. The forward end of each runner 65 is connected by a pair of straps 66 to the associated pipe member 56, the straps 66 being connected to the latter by means of a bolt 67 and to the forward or upper end of the associated runner 65 by a bolt 68, the pipe 56 being apertured to receive the bolt 67. The rear portion of each runner 65 includes a rear cross block (not shown) to which the lower end of an L-shaped bracket 71 is connected by any suitable means. At its upper end the aforesaid bracket 71 is connected by bolt means 72 or other suitable fastener to the bracket plates 61. Lower extension plates 74 are connected to the plates 61 by bolt means 75 and also by the forward bolt means 72.

As shown in FIGS. 5 and 6, a press wheel frame 77, which includes two generally fore-and-aft extending bars 78, is rigidly connected to the bracket plates 61 by a pair of bolts 79 or other suitable means, and pivotally connected to the rear end of the frame 77 is a press wheel unit 80, the latter including a press wheel 81 and a wheel frame 82. The wheel frame 82 is pivotally connected at 83 with the rear ends of the frame bars 78 and may be disposed in different positions of adjustment by a hand lever 84 and associated fixed locking sector (not shown), the parts being of usual construction. The hand lever 84 may be locked out when desired to permit the press wheel to float, as will be referred to below. The frame bars 78 carry depending standards 87 to which covering knives 88 are swingably connected.

A hopper support casting 91 is connected in any suitable way to the bracket plates 61 and carries a seed hopper 92. The weight of the hopper and contents is imposed directly on the rear end of the pipe or draw bar 56 so that this weight ensures the penetration of the runner 65 to the desired depth. The rear portions of the furrow opener units 55, each of which includes a pipe or draw bar 56, are interconnected by cross bars 93, best shown in FIG. 1, the ends of the bars 93 being connected in any suitable way to suitable lugs or the like at the rear portions of the bracket plates 61. Each hopper 92 includes conventional seed dispensing means driven from the associated press wheel 81 by suitable drive chain means 94 (FIG. 5). Seed dispensed by the above mentioned dispensing means in the hoppers 92 is delivered into associated spout sections 96 from which the seed falls through seed tubes 97 (FIG. 1) into the furrows made by the associated runners 65.

Each furrow opener unit 55 is independently connected with the rear frame pipe 13 by a lifting and cushioning means 101. The latter includes a rod 102 swingably connected by trunnion means 103 with a pair of apertured lugs 104 fixed, as by welding, to the rear portion of the pipe 56. The upper end of the rod 102 extends through one of several openings 106 provided in a bracket 105 fixed to the adjacent portion of the rear frame pipe member 13. A pressure spring 107 is disposed between the lugs 104 and the associated bracket 105, and a cushioning spring 108 is disposed between the upper side of the bracket 105 and a pair of lock nuts 109 carried at the upper end of the rod 102, the upper end of which is threaded to receive the lock nuts 109. Thus, when the power lift 28 of the tractor is actuated to lift the rear end of the frame 11, the rear ends of all of the units 55 are raised through the associated lifting and cushioning means 101. The springs 108 serve to protect the frame 11 against impact shocks that may occur when the outfit is moved in a raised or transport position over rough ground or the like. In operation, if desired, the weight of the rear portion of the frame 11 may be added to the several furrow opener units 55 by lowering the lift arms 32, whereupon the rear portion of the frame 11 is lowered against the springs 107, thus adding the weight of the rear portion of the frame to the several furrow opener units to insure proper penetration of the associated furrow openers. The frame 11 also carries a station 115 (FIG. 1) adapted to carry an auxiliary operator, for example, one whose duty it is to watch the operation of the several seed dispensing means. This unit includes a seat 116 and a seat supporting member 117 in the form of a pipe the forward end of which is connected as at 118, to a short pipe section (not shown) welded to the central portion of the rear frame pipe 13 and arranged to extend rearwardly in a generally horizontal position. The operator supported on the seat 116 is in a position to conveniently check the operation of the several planting units and to make any adjustment of any of the press wheels, as by operating the hand levers 84. He is also in a position to operate the tractor power lift means 28 if it should be desired to relieve the driver of the tractor of this duty. Further, when the frame 11 is lowered to impose the weight thereof onto the furrow openers, as when operating under difficult penetrating conditions, the weight of the operator or watcher on the support 115 is also added to the furrow opener, this added weight being imposed at a mechanical advantage due to the rearwardly extended position of the seat 116 and the seat support 117.

Any one of a number of different types of furrow openers and/or associated parts, as required by soil conditions, farming practices, and/or other factors, may be connected with the bracket plates 61. For example, FIG. 5 shows a new and improced gauge shoe unit 125 that may be connected to the rear bracket plates 61 and associated parts, the unit being so constructed and arranged as to provide easy and convenient adjustment of the unit relative to the associated runner 65.

Referring now to FIG. 5, the unit 125 includes a pair of gauge shoe plates 126 suitably connected together with a space 127 in between to permit the rear portion of the gauge shoe plates to be disposed at opposite sides of the runner 65 with sufficient clearance to accommodate vertical adjustment of the unit 125 relative to the runner 65. Fixed to the forward and upwardly curved portions of the gauge shoe plates 126 are a pair of brackets 128 to which rearwardly and upwardly extending links 129 are pivotally connected. The rear ends of the link 129 are apertured to receive a cross pin 131 that extends through suitable apertures formed in a pair of upstanding standards 132. The latter are affixed at the lower ends 133 to the generally rear portions of the gauge shoe plates 126. The links 129 and standards 132 form rigid attaching means carried by the gauge shoe plates. The upper ends of the standards 132 are provided with a plurality of apertures 135, in any registering set of which an attaching pin 137 may be disposed. This pin is adapted to be inserted in one of several openings 138 (FIG. 6) formed in the lower portion of the yoke parts 63. A pusher frame 141 connects the standards 132 with the rear or lower portions of the extension brackets 74, and the frame 141 comprises a pair of bars 142 secured, as by welding, to a sleeve 143 that is disposed about the pin or rod 131. The rear ends of the bars 142 are apertured to receive pivot members 145 by which the push frame 141 is swingably connected with the extension brackets 74.

To raise or lower the gauge shoe unit 125, all that it is necessary to do is to remove the attaching pin 137, manually raise or lower the gauge shoes the necessary or desired amount, and then reinsert the attaching pin 137. It will be seen from FIG. 6 that the openings 138 are arranged not only above one another but also spaced apart in a fore-and-aft direction. This permits the operator to change the angle of the gauge shoe plates 126 so as to tilt the front ends downwardly or upwardly, as desired, depending on whether the pin 137 is inserted in a pair of forward openings 138 or in a pair of rear openings.

Where gauge shoes are used, it is preferable to permit the press wheels to float, yet have some pressure applied to them to ensure proper driving of the dispensing mechanism. Accordingly, we provide a pressure spring means in the form of a rod 146 and spring 147 (FIG. 9). The rod 146 is connected into one of the openings in an arm 148 fixed to the press wheel frame pivot member 87. The other end of the rod 146 is inserted in an opening in cross bar 61a or the like fixed to the rear edges of the bracket plates 61. The spring 147 is confined between the cross bar 61a and an adjustable set screw collar 149 on the rod 136. With the associated hand lever 84 locked out, the press wheel unit can float, permitting the shoe unit 125 to gauge the depth of operation. However, the spring 147 holds the press wheel 81 in driving contact with the ground.

Another form of furrow opening means is illustrated in FIG. 6. Referring now to this FIGURE, it will be observed that in this arrangement the shoe type or runner type of furrow opener is replaced by a pair of furrow opening disks 150. The double disk type of opener is commonly employed where stones, quack grass, cornstalks, and trash are a problem. Disk openers cut through the trash and roll up and over sticks, stones and the like. As shown in FIG. 6, the disks 150 are journaled in a supporting frame 151 that includes a pair of fore-and-aft extending built up frame members 152 bolted at the rear ends to the lower portions of the covering knife brackets 87. At the forward ends, the members 152 are supported by a link 154 that extends forwardly and upwardly and is connected by adjustable clip means 155 with the adjacent portion of the associated draw bar pipe member 56. The link member 154 includes a lower sleeve section 157 to which additional reference will be made.

In FIG. 6, the furrow opener unit carries or includes a sweep attachment 165 that is of the type commonly used to sweep off the tops of beds when planting, and in using this attachment the relation between the sweep and the associated disk furrow openers 150 determine the depth of planting, rather than the associated press wheel. According to the principles of the present invention new and improved means is provided for vertically adjusting the sweep parts relative to the associated furrow opener.

The sweep attachment 165 includes a pair of blades 166, one right hand and one left hand, the forward ends of the blades being bent to form a flat forwardly extending sharpened narrow portion 167. The blades 166 are adjustably fixed, as by bolts 168 and 169, to a pair of supporting plates 171 that are interconnected at the forward ends by a V-shaped member 172, the rear portion of which carries suitable pivot means (not shown) swingably receiving the lower end of a pair of supporting arms 173 that are fixed to a cross shaft 174 which extends through apertures in the front portions of the members 152 and through the sleeve 157 that is welded to the lower or rear end of the link 154. A third arm 175 is fixed to the cross shaft 174 and carries a pivot 176 that is optionally disposed in one of a plurality of apertures 177 formed in a link 178 that extends rearwardly from the pin or pivot 176 to an arm 181 that is welded to a rear cross shaft 182. The latter shaft is supported by suitable means on the rear portions of the members 152 and connected to each outer end of the rear cross shaft 182 is an arm 184 that is pivotally connected, as at 185, to a bar that is rigidly fixed to the associated supporting plate 171. It will be seen from FIG. 6 that there is a plurality of openings 177 and that the arm 175 extends upwardly but generally parallel to the arm 181 that extends downwardly. Thus, by removing the hairpin connector 186, the link 178 may be disconnected from the arm 175, after which the sweep attachment blades may be raised or lowered, as desired and the pin 176 engaged in another opening 177. The hairpin connector 186 is then replaced. Thus, the sweep may be raised and lowered through generally parallel positions, the arms 173 and 184 being generally parallel and of substantially the same effective length. The forward end of the link 178 is shaped, as indicated at 188, to form a handle which facilitates making the adjustment just described.

According to the principles of the present invention, the attachment of the planter to the tractor is easily, simply and quickly accomplished. FIG. 1 shows the implement of the present invention supported on the ground and ready to receive the tractor. The latter is backed into the implement, with the rear wheels 27 passing over the end portions of the front frame part 12 and in between the furrow opener frame bars 56. When the tractor has been backed an amount sufficient to bring the sway limit castings 42 into position between the rub plates 41, the operator reaches down, picks up the lift chains 37 and, with the power lift arms 32 lowered, inserts the attaching plugs 35 in the outer ends of the arms 32. He then actuates the power lift unit to raise the arms 32 substantially into the positions shown in FIG. 2. The lift chains 37 are connected to the center frame bars 15 at points well forward of the center of gravity of the implement, and therefore the initial movement of the power lift arms acts to raise the front frame pipe 12 up against the bottom of the tractor. According to the present invention, we make use of this action to effect an automatic draft-transmitting connection with the tractor by virtue of automatic latch means that will now be described.

Figure 3:
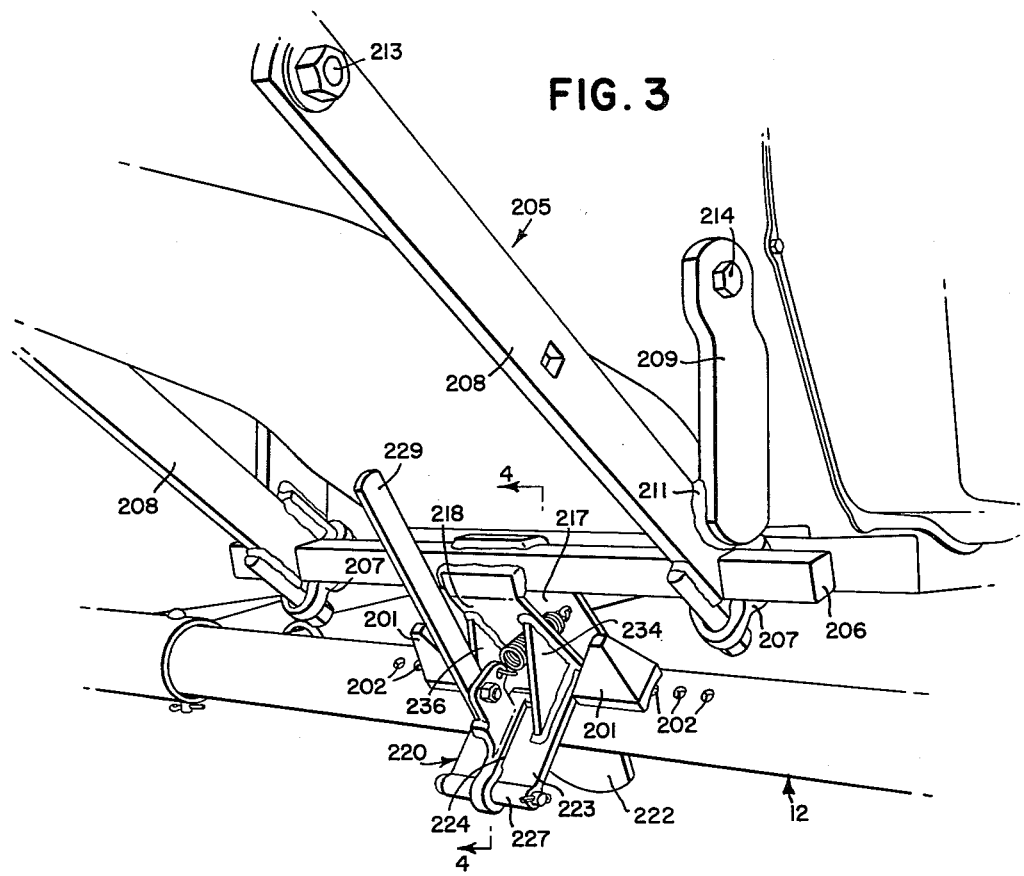
FIG. 3 is an enlarged fragmentary perspective view showing the means for connecting the front portion of the implement with the generally central lower portion of the tractor in draft-receiving relation.
Figure 4:
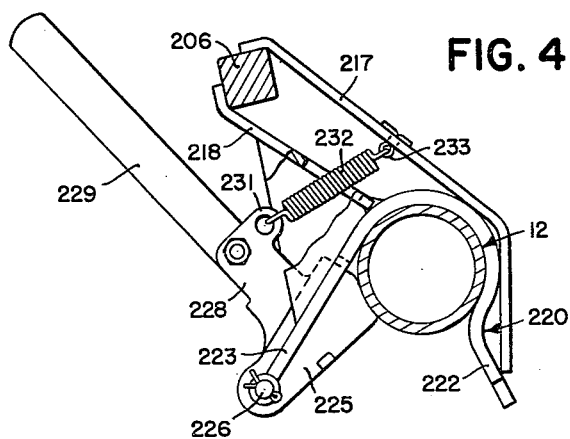
FIG. 4 is a sectional view taken at an enlarged scale along the line 4—4 of FIG. 3.

Referring to FIGS. 1, 3 and 4, it will be seen that the central portion of the front frame pipe 12 carries a pair of guide blocks 201 which are secured to the central portion of the front frame member 12 by means extending through selected openings of a plurality of openings 202 formed in the pipe 12. Fixed to the lower portion of the tractor approximately midway between the front and rear wheels thereof is a latch-supporting bracket structure indicated in its entirety by the reference numeral 205. This structure comprises a cross bar 206, preferably square in cross section and removably clamped by suitable means 207 to the rear lower ends of a pair of straps 208, which ends are notched to receive the bar 206. The straps 208 have struts 209 welded thereto, as indicated at 211, and the upper ends of the straps 208 and the struts 209 are apertured to receive attaching bolt means 213 and 214. Normally this bracket structure can remain on the tractor more or less as a permanent attachment thereto since it does not interfere with the mounting of most other tractor-carried or tractor-connected implements. As shown in FIG. 4, a pair of downwardly and rearwardly extending plates 217 and 218 are secured, as by welding, to the central portion of the attaching bar 206. The plates 217 and 218 receive a generally U-shaped downwardly facing socket member 220, the rear portion 222 of which extends downwardly and rearwardly and the front portion 223 of which extends downwardly and forwardly and is provided centrally with a T slot 224 in which a pivoted latch member 225 (FIG. 4) is disposed. The latch member 225 is swingably supported on a pin 226 that is carried by a sleeve section 227 secured to or forming a part of the front socket section 223. Preferably, the latch 225 is in the form of a casting and is provided with a vertically extending lug 228 to which an operating handle 229 is bolted. The casting 225 includes an apertured portion 231 in which a spring 232 is connected, the rear end of the spring being anchored to the bracket plate 217 by a cotter 233 or other suitable means. As best seen in FIG. 3, the forward section 223 of the socket member 220 is reinforced by gusset plates 234 and 236 welded to the socket section 223 and to the adjacent portions of the bracket plate 218. The spring 232 extends between the gusset member 234.

When the implement is connected to the tractor in the manner described above and the tractor power lift mechanism operated to raise the front frame member 12 into contact with the tractor, the guide blocks 201 cooperate with the sides of the socket section 220 to guide the bar 12 into the socket member 220. Continued operation of the tractor power lift raises the pipe 12 up into locked position in the U-shaped member 220, after which the spring 232 will automatically swing the latch 225 into a position, such as that shown in FIG. 4, effectively locking the frame pipe 12 into position. Also, blocks 201 cooperate with the sides of the socket member to hold the pipe member 12 in position laterally. The pipe member 12 may be released at any time desired merely by pulling downwardly on the latch lever 229 which will swing the latch 225 upwardly and forwardly (FIG. 4) until the pipe 12 is permitted to drop to the ground, after which the lift chains 37 may be disconnected from the tractor lift arms and the tractor then driven forwardly away from the machine. In most cases, the tractor may be connected, or disconnected, in a matter of a minute or two, depending upon the skill of the operator in positioning the tractor so that when the front of the frame is raised the blocks 201 will come up against the opposite sides of the socket member 220.

A modified form of furrow opener unit is shown in FIG. 7. Generally speaking, this unit, indicated in its entirety by the reference numeral 55a, is quite similar to the furrow opener unit shown in FIGS. 1, 5 and 6. The furrow opener unit 55a includes a draw bar 241, preferably in the form of a pipe that is connected with the front frame pipe 12 in the manner described above. However, the draw bar pipe 241 is formed with an upwardly bent section 242 so that the member will clear a clod-crushing and pulverizing wheel 243 that, in this form of the invention, is mounted forwardly of the associated furrow opening means indicated in its entirety in FIG. 7 by the reference numeral 244. The forwardly mounted ground wheel 243 is carried on a pair of downwardly and forwardly extending bars 247 pivotally connected at their rear ends, as at 248, with the rear portions of a pair of strap members 249 that are fixed in any suitable way to the sides of the pipe member 242. The furrow opener means 244, comprises a sweep type bottom 251 connected to the rear end of the pipe member 241 by a friction trip type of standard 252, a type that is conventional in listers, bedders, and similar types of ground working tools. Secured to the standard 252 is a pair of rearwardly extending attaching plates 254, the rear portions of which receive a runner bracket 255. The furrow opener preferably is in the form of a short runner 256 into which seed is delivered through a tube spout 257. A spring pressed wheel 258 is swingably connected with the associated attaching plates 254 and acts to press the deposited seed down into the moist soil at the bottom of the furrow opened by the furrow opener 256.

In operation, in the planter arrangement just described, the furrow opener unit is especially adapted for use when planting on prepared beds, in which case the wheel in front serves as a gauge wheel to gauge the depth of the sweep 251 and the sweep serves to cut dry dirt off the top of the bed and expose moist soil in which the seed is planted. Also any weeds that have germinated are destroyed in this process. This arrangement, with conventional runners or other furrow openers, may be employed for planting in plowed ground in which further seed bed preparation has been eliminated. As the tractor passes across the field, the forwardly mounted wheels 243 crush any clods or the like, the soil is smoothed and/or firmed by the wheels, and a seed-receiving furrow is formed therein by the associated furrow opener. The hopper 92a of FIG. 7 may be of substantially the same construction as the hoppers 92 described above.

A further form of this invention is illustrated fragmentarily in FIG. 8. In this form of invention, each end of the front frame pipe 12, see FIG. 1, is provided with a frame pipe extension 261 having at its inner end suitable means (not shown) that is adapted to be inserted into the associated outer end of the main frame pipe 12. The structure is reinforced by a strut 262 and a tie rod 263 that extends across the joint and is connected at 264 with the main frame pipe 12 and at 265 with the extension pipe member 261. The outer end of the latter is adapted to receive the forward end of an associated furrow opener unit 55b which may be of substantially the same construction as shown in FIG. 1 and described above. A similar extension is provided for each outer end of the rear frame pipe 13, and when the extension pipes are in place, six rows may be planted at one time.

While I have shown and described above the preferred structure in which the principles of this invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. The combination with a tractor having power lift means, of an implement including a tractor-carried frame, means movably connecting the forward portion of said frame with the tractor, means movably connecting the rear portion of said frame with said power lift means, whereby operation of the latter serves to raise and lower the rear portion of the frame relative to the tractor, a plurality of generally fore and aft extending planter furrow opener units, each having a forward end and a rearward end, means movably connecting the forward ends of said opener units with the forward portion of said frame whereby the opener units underlie the rear portion of said frame, lift means connecting the rear portion of said frame with the rear ends of said opener units, whereby the rear ends of said opener units are raised when said power lift means is actuated to raise the rear portion of said frame, said power lift means including a connection disposed between the rear portion of said frame and said opener units whereby the weight of the rear portion of said frame may be imposed on said units so as to increase the penetration of said furrow opening units.

2. The combination with a tractor having power lift means actuable to raise and lower implements and the like, of a detachable agricultural implement including a main frame comprising front and rear transverse frame bars, a plurality of fore and aft extending laterally inner and outer frame bars, and means rigidly interconnecting said transverse and fore and aft extending bars, laterally inner and outer fore and aft extending draft bars, means swingably connecting the forward ends of said draft bars with said front transverse bar and disposing said draft bars adjacent said fore and aft extending bars, the rear wheels of the tractor being adapted to pass over the front transverse bar when the tractor is backed into position to receive the implement, the laterally inner draft bars and the laterally inner frame bars being disposed between said rear tractor wheels when the implement is attached to the tractor, means connecting the tractor power lift means with the rear portion of the implement frame, and lifting connections between the rear transverse frame bar and the rear ends of all of said draft bars.

3. The combination with a tractor having power lift means, of an implement including a tractor-carried frame, means movably connecting the forward portion of said frame with the tractor, means connecting the rear portion of said frame with said power lift means whereby operation of the latter serves to raise and lower the rear portion of said frame relative to the tractor, a plurality of generally fore and aft extending planter furrow opener units, means swingably connecting the forward ends of said opener units to the forward portion of said frame and disposing said opener units in a position underlying the rear portion of said frame, and lift means connecting the rear portion of said frame with the rear ends of said opener units, whereby all of said opener units are raised when said power lift means is actuated to raise said frame, said lift means including relative movable parts connected, respectively, with said tractor-carried frame and said furrow opener units, and spring means connected with said parts to yieldingly oppose relative movement between said opener units and said frame in either an upward or a downward direction.

4. The combination with a tractor having power lift means, of an implement including a tractor-carried frame, means movably connecting said frame adjacent its forward portion with the tractor, means connecting said frame adjacent its rear portion with said power lift means whereby operation of the latter serves to raise and lower the rear portions of the frame relative to the tractor, a plurality of planter furrow opener units, each of said furrow opener units comprising a fore and aft extending member, ground-working means, means connecting said ground working means to the rear end of said member generally in the vertical plane of the latter, a clod crushing wheel, means connecting said clod crushing wheel with said member in a position forward of said ground-working means, said member being curved upwardly where it passes over said wheel, and means mounted on said member to adjust the position of each wheel relative to each of said opener units, means swingably connecting said planter furrow opener units at their forward ends to the forward portion of said frame so that said opener units underlie the rear portion of said frame, lift means connecting the rear portion of said frame with the rear ends of said opener units, whereby the rear ends of all of said opener units are raised when said power lift means is actuated to raise the rear portion of said frame.

5. For use with a tractor having power lift means, an implement comprising a main frame having a forward portion and a rear portion, means to movably connect the forward portion of said frame with the tractor, means to movably connect said frame adjacent its rear portion with the power lift means, whereby when the forward portion of the implement is connected to the tractor and the rear portion to the power lift, operation of the latter serves to raise and lower the rear portion of the frame relative to the tractor, a plurality of generally fore-and-aft extending draft bars, means connecting the forward ends of said draft bars to the forward portion of the frame, the rear ends of said draft bars underlying the rear portion of said frame, and means connecting the rear portion of said frame with the rear ends of said draft bars, whereby the rear ends of all of said opener units are raised when said power lift means is actuated to raise the rear portions of said frame.

6. The invention set forth in claim 5, further characterized by said main frame including laterally outer fore-and-aft extending frame bars and laterally inner fore-and-aft extending frame bars, a forward transverse frame bar and a rear transverse frame bar, and means rigidly connecting the front and rear ends of said fore-and-aft extending frame bars with said forward and rear transverse bars, respectively, means swingably connecting the forward ends of said draft bars with said forward transverse frame bar at points adjacent said fore-and-aft extending frame bars, brackets fixed to said rear transverse frame bar adjacent the points at which the rear ends of said fore-and-aft extending frame bars are fixed to said rear transverse frame bar, and the means connecting the rear ends of said draft bars with the rear portion of said main frame including vertically shiftable means connected with said brackets.

7. The invention defined in claim 6, further characterized by said brackets being elongated in a direction longitudinally of said rear transverse frame bar and having a longitudinal series of openings therethrough, and said vertically shiftable means including a rod pivoted to the rear end portion of each draft bar and extending upwardly through the associated selected bracket opening, spring means disposed on each rod above the associated bracket, and stop means carried by the upper portion of said rod and receiving the reaction of said spring means.

References Cited in the file of this patent

UNITED STATES PATENTS

| | | |
|---|---|---|
| 947,216 | Philippi | Jan. 18, 1910 |
| 1,735,597 | Chicolsky | Nov. 12, 1929 |
| 1,856,208 | Burkle | May 3, 1932 |
| 1,897,355 | Altgelt | Feb. 14, 1933 |
| 1,943,778 | White | Jan. 16, 1934 |
| 2,048,584 | White | July 21, 1936 |
| 2,071,324 | Bateman | Feb. 23, 1937 |
| 2,091,823 | Large | Aug. 31, 1937 |
| 2,269,987 | Raney | Jan. 13, 1942 |
| 2,407,006 | Harris | Sept. 3, 1946 |
| 2,416,189 | McIntyre | Feb. 18, 1947 |
| 2,587,765 | Rohrer | Mar. 4, 1952 |
| 2,603,138 | Rafferty | July 15, 1952 |
| 2,685,241 | Silver | Aug. 3, 1954 |
| 2,719,498 | Goolsby | Oct. 4, 1955 |
| 2,732,784 | Tanke | Jan. 31, 1956 |
| 2,855,875 | Oehler | Oct. 14, 1958 |